(12) United States Patent
Carter et al.

(10) Patent No.: US 10,063,523 B2
(45) Date of Patent: Aug. 28, 2018

(54) CRAFTED IDENTITIES

(75) Inventors: Stephen R. Carter, Spanish Fork, UT (US); Lloyd Leon Burch, Payson, UT (US); Dale Robert Olds, Sandy, UT (US)

(73) Assignee: Oracle International Corporation, Redwood Shores, CA (US)

( * ) Notice: Subject to any disclaimer, the term of this patent is extended or adjusted under 35 U.S.C. 154(b) by 512 days.

(21) Appl. No.: 11/225,993

(22) Filed: Sep. 14, 2005

(65) Prior Publication Data

US 2007/0061263 A1    Mar. 15, 2007

(51) Int. Cl.
*H04L 29/06*    (2006.01)

(52) U.S. Cl.
CPC ........ *H04L 63/0421* (2013.01); *H04L 63/102* (2013.01); *H04L 63/20* (2013.01); *H04L 63/0807* (2013.01)

(58) Field of Classification Search
None
See application file for complete search history.

(56) References Cited

U.S. PATENT DOCUMENTS

| | | |
|---|---|---|
| 4,123,747 A | 10/1978 | Lancto et al. |
| 5,005,200 A | 4/1991 | Fischer |
| 5,361,359 A | 11/1994 | Tajalli et al. |
| 5,388,213 A | 2/1995 | Oppenheimer et al. |
| 5,544,322 A | 8/1996 | Cheng et al. |
| 5,579,478 A | 11/1996 | Heiserman et al. |
| 5,638,446 A | 6/1997 | Rubin |
| 5,692,047 A | 11/1997 | Mcmanis |
| 5,813,009 A | 9/1998 | Johnson et al. |
| 5,892,904 A | 4/1999 | Atkinson et al. |
| 5,918,210 A | 6/1999 | Rosenthal et al. |
| 5,924,077 A | 7/1999 | Beach et al. |
| 5,987,134 A | 11/1999 | Shin et al. |
| 6,023,704 A | 2/2000 | Gerard et al. |
| 6,025,757 A | 2/2000 | Tsukagoshi et al. |
| 6,029,144 A | 2/2000 | Barrett et al. |
| 6,041,411 A | 3/2000 | Wyatt |
| 6,055,637 A * | 4/2000 | Hudson ............... G06F 21/6218 709/225 |
| 6,067,525 A | 5/2000 | Johnson et al. |
| 6,073,234 A | 6/2000 | Kigo et al. |

(Continued)

FOREIGN PATENT DOCUMENTS

| | | |
|---|---|---|
| EP | 1773020 A1 | 9/2006 |
| EP | 1764978 | 3/2007 |

(Continued)

OTHER PUBLICATIONS

U.S. Appl. No. 11/638,121, filed Dec. 13, 2006, Policy Enforcement via Attestations.

(Continued)

*Primary Examiner* — Tsan-Yu J Huang
(74) *Attorney, Agent, or Firm* — Kilpatrick Townsend & Stockton LLP

(57) ABSTRACT

Crafted identities are provided. A statement is provided to the principal for using a crafted identity. The statement includes an identifier that provides access to a resource when presented by the principal to the resource. The statement also includes one or more roles and permissions for the crafted identity when accessing the resource.

30 Claims, 3 Drawing Sheets

(56) References Cited

U.S. PATENT DOCUMENTS

| | | | |
|---|---|---|---|
| 6,092,194 A | 7/2000 | Touboul | |
| 6,107,931 A | 8/2000 | Nicholson | |
| 6,149,522 A | 11/2000 | Alcorn et al. | |
| 6,167,513 A | 12/2000 | Inoue et al. | |
| 6,170,057 B1 | 1/2001 | Inoue et al. | |
| 6,230,271 B1 | 5/2001 | Wadlow et al. | |
| 6,308,163 B1 | 10/2001 | Du et al. | |
| 6,463,468 B1* | 10/2002 | Buch | G06Q 30/02 709/217 |
| 6,471,521 B1 | 10/2002 | Dornbush et al. | |
| 6,516,416 B2 | 2/2003 | Gregg et al. | |
| 6,532,451 B1 | 3/2003 | Schell et al. | |
| 6,561,425 B2 | 5/2003 | Kresina et al. | |
| 6,600,168 B1 | 7/2003 | Geng | |
| 6,615,352 B2 | 9/2003 | Terao et al. | |
| 6,671,350 B1 | 12/2003 | Oxley | |
| 6,704,728 B1 | 3/2004 | Chang et al. | |
| 6,715,073 B1 | 3/2004 | An et al. | |
| 6,718,470 B1* | 4/2004 | Adams | G06F 21/33 713/175 |
| 6,725,269 B1 | 4/2004 | Megiddo | |
| 6,735,701 B1 | 5/2004 | Jacobson | |
| 6,750,883 B1 | 6/2004 | Parupudi et al. | |
| 6,754,642 B2* | 6/2004 | Tadayon | G06Q 20/123 705/1.1 |
| 6,769,060 B1 | 7/2004 | Dent et al. | |
| 6,795,967 B1 | 9/2004 | Evans et al. | |
| 6,807,636 B2 | 10/2004 | Hartman et al. | |
| 6,820,135 B1 | 11/2004 | Dingman et al. | |
| 6,836,843 B2 | 12/2004 | Seroussi et al. | |
| 6,871,279 B2 | 3/2005 | Sames et al. | |
| 6,931,440 B1 | 8/2005 | Blumenau et al. | |
| 6,937,976 B2 | 8/2005 | Apte | |
| 6,944,183 B1 | 9/2005 | Iyer et al. | |
| 6,957,332 B1 | 10/2005 | Ellison et al. | |
| 7,098,753 B1 | 8/2006 | Dumitrescu et al. | |
| 7,120,802 B2 | 10/2006 | Shear et al. | |
| 7,123,113 B1 | 10/2006 | Brennan et al. | |
| 7,219,142 B1 | 5/2007 | Parekh et al. | |
| 7,290,288 B2 | 10/2007 | Gregg et al. | |
| 7,292,114 B2 | 11/2007 | Greenberg | |
| 7,332,979 B2 | 2/2008 | Connell et al. | |
| 7,350,237 B2 | 3/2008 | Vogel et al. | |
| 7,734,754 B2 | 6/2010 | Dougherty et al. | |
| 7,788,366 B2 | 8/2010 | Yacoby et al. | |
| 7,788,711 B1 | 8/2010 | Sun et al. | |
| 8,281,374 B2 | 10/2012 | Carter | |
| 8,316,237 B1 | 11/2012 | Felsher et al. | |
| 8,468,330 B1 | 6/2013 | Reed et al. | |
| 9,781,154 B1 | 10/2017 | Carter et al. | |
| 2001/0051906 A1 | 12/2001 | Esposito | |
| 2001/0052012 A1 | 12/2001 | Rinne et al. | |
| 2002/0029340 A1* | 3/2002 | Pensak | H04L 63/0428 713/182 |
| 2002/0107875 A1 | 8/2002 | Seliger et al. | |
| 2002/0120917 A1 | 8/2002 | Abrari et al. | |
| 2002/0138735 A1 | 9/2002 | Felt et al. | |
| 2002/0147801 A1 | 10/2002 | Gullotta et al. | |
| 2002/0156785 A1 | 10/2002 | Kumar et al. | |
| 2002/0160347 A1 | 10/2002 | Wallace et al. | |
| 2002/0169876 A1 | 11/2002 | Curie et al. | |
| 2002/0186844 A1 | 12/2002 | Levy et al. | |
| 2003/0070091 A1 | 4/2003 | Loveland | |
| 2003/0074579 A1* | 4/2003 | Della-Libera | H04L 45/02 726/1 |
| 2003/0088786 A1* | 5/2003 | Moran | G06F 21/6218 726/4 |
| 2003/0115179 A1 | 6/2003 | Prabakaran et al. | |
| 2003/0115246 A1 | 6/2003 | Mahon et al. | |
| 2003/0126464 A1 | 7/2003 | McDaniel et al. | |
| 2003/0130931 A1 | 7/2003 | Mirlas et al. | |
| 2003/0131232 A1 | 7/2003 | Fraser et al. | |
| 2003/0140230 A1 | 7/2003 | de Jong et al. | |
| 2003/0149599 A1 | 8/2003 | Goodall et al. | |
| 2003/0153991 A1 | 8/2003 | Visser et al. | |
| 2004/0044643 A1 | 3/2004 | DeVries et al. | |
| 2004/0044730 A1 | 3/2004 | Gockel et al. | |
| 2004/0064568 A1 | 4/2004 | Arora et al. | |
| 2004/0093502 A1* | 5/2004 | Shurygailo | H04L 63/104 713/183 |
| 2004/0107118 A1 | 6/2004 | Harnsberger et al. | |
| 2004/0128392 A1 | 7/2004 | Blakley, III et al. | |
| 2004/0128506 A1 | 7/2004 | Blakley, III et al. | |
| 2004/0139319 A1 | 7/2004 | Favazza et al. | |
| 2004/0148326 A1 | 7/2004 | Nadgir et al. | |
| 2004/0151323 A1 | 8/2004 | Olkin et al. | |
| 2004/0162833 A1 | 8/2004 | Jones et al. | |
| 2004/0177326 A1 | 9/2004 | Bibko et al. | |
| 2004/0210771 A1* | 10/2004 | Wood | G06F 21/31 726/8 |
| 2004/0221049 A1 | 11/2004 | Blumenau et al. | |
| 2004/0236702 A1* | 11/2004 | Fink | G06Q 20/382 705/73 |
| 2004/0240846 A1 | 12/2004 | Cookson et al. | |
| 2005/0027845 A1 | 2/2005 | Secor et al. | |
| 2005/0044411 A1* | 2/2005 | Somin | H04L 63/102 726/4 |
| 2005/0060584 A1 | 3/2005 | Ginter et al. | |
| 2005/0068983 A1 | 3/2005 | Carter et al. | |
| 2005/0120201 A1 | 6/2005 | Benaloh et al. | |
| 2005/0144144 A1 | 6/2005 | Graff | |
| 2005/0204129 A1 | 9/2005 | Sudia et al. | |
| 2005/0216956 A1 | 9/2005 | Orr et al. | |
| 2005/0228688 A1 | 10/2005 | Visser et al. | |
| 2005/0254652 A1 | 11/2005 | Engler et al. | |
| 2005/0257045 A1 | 11/2005 | Bushman et al. | |
| 2006/0005254 A1 | 1/2006 | Ross | |
| 2006/0071729 A1 | 4/2006 | Cetin et al. | |
| 2006/0095953 A1 | 5/2006 | Frank | |
| 2006/0100010 A1 | 5/2006 | Gatto et al. | |
| 2006/0200680 A1 | 9/2006 | Ellison et al. | |
| 2007/0061263 A1* | 3/2007 | Carter | H04L 63/0421 705/51 |
| 2007/0061872 A1 | 3/2007 | Carter | |
| 2007/0112574 A1 | 5/2007 | Greene | |
| 2007/0143824 A1 | 6/2007 | Shahbazi | |
| 2007/0179802 A1 | 8/2007 | Buss et al. | |
| 2007/0180490 A1 | 8/2007 | Renzi et al. | |
| 2007/0244833 A1 | 10/2007 | Camenisch | |
| 2008/0180693 A1 | 7/2008 | Dillon et al. | |
| 2011/0052012 A1 | 3/2011 | Bambha et al. | |
| 2017/0374096 A1 | 12/2017 | Carter et al. | |

FOREIGN PATENT DOCUMENTS

| | | |
|---|---|---|
| EP | 1933264 | 6/2008 |
| EP | 1764978 | 11/2010 |
| EP | 1773020 B1 | 11/2017 |

OTHER PUBLICATIONS

"European Search Report for Application No. EP 06 12 0148", 12 Pages.

Bajaj, Siddharth, et al., "Web Services Federation Language (WS Federation)", Version 1.0, (Jul. 8, 2003), 1-34.

Hallam-Baker, Phillip, "Security Assertions Markup Language", *Security Assertions Markup Language, Core Assertion Architecture—Examples and Explanations*, Draft Version 0.7, (May 14, 2001), 24 Pages.

"European Application No. 07122559 Search Report", (dated Apr. 10, 2008), 2 pgs.

Abbie Barbir Nortel Networks, "Overview and Summary of SAML v. 2", (Oct. 5, 2004), 7 pgs.

Hughes, J, et al., "Security Assertion Markup Language: Technical Overview", (Sep. 12, 2005), 40 pgs.

Poniszewska-Maranda, A, "Role engineering of information system using extended RBAC model", *Enabling Technologies: Infrastructure for collaborative enterprise, 14th IEEE Workshops on Linkoping*, Sweden Jun. 13-15, 2005, (Jun. 13, 2005), 154-159.

Siemens, Gunther C, "SAML in Authorization Policies", (Feb. 13, 2005), 7 pgs.

(56) References Cited

OTHER PUBLICATIONS

U.S. Appl. No. 11/225,994, Feb. 24, 2009, Office Action.
U.S. Appl. No. 11/225,994, Jul. 30, 3009, Final Office Action.
U.S. Appl. No. 11/225,994, Oct. 27, 2009, Advisory Action.
U.S. Appl. No. 11/225,994, Jan. 25, 2010, Office Action.
U.S. Appl. No. 11/225,994, Jul. 22, 2020, Final Office Action.
U.S. Appl. No. 11/225,994, Oct. 25, 2010, Advisory Action.
U.S. Appl. No. 11/225,994, Sep. 19, 2011, Office Action.
U.S. Appl. No. 11/225,994, Mar. 21, 2012, Notice of Allowance.
U.S. Appl. No. 11/638,121, Nov. 27, 2009, Restriction Requirement.
U.S. Appl. No. 11/638,121, Apr. 15, 2020, Office Action.
U.S. Appl. No. 11/638,121, Oct. 15, 2010, Final Office Action.
U.S. Appl. No. 11/638,121, Dec. 23, 2010, Advisory Action.
U.S. Appl. No. 10/612,666, Oct. 31, 2006, Non-Final Office Action.
U.S. Appl. No. 10/612,666, Jun. 15, 2007, Final Office Action.
U.S. Appl. No. 10/612,666, Aug. 31, 2007, Advisory Action.
U.S. Appl. No. 10/612,666, Dec. 31, 2007, Non-Final Office Action.
U.S. Appl. No. 10/612,666, Jul. 9, 2008, Final Office Action.
U.S. Appl. No. 10/612,666, Jan. 3, 2009, Pre-Appeal Brief Review Panel Decision—Rejected.
U.S. Appl. No. 10/612,666, May 21, 2009, Non-Final Office Action.
U.S. Appl. No. 10/612,666, Dec. 4, 2009, Final Office Action.
U.S. Appl. No. 10/612,666, Feb. 19, 2010, Advisory Action.
U.S. Appl. No. 10/612,666, Apr. 5, 2010, Non-Final Office Action.
U.S. Appl. No. 10/612,666, Sep. 13, 2010, Final Office Action.
U.S. Appl. No. 10/612,666, Dec. 1, 2010, Advisory Action.
U.S. Appl. No. 10/612,666, Jan. 7, 2011, Non-Final Office Action.
U.S. Appl. No. 10/612,666, Jun. 23, 2011, Final Office Action.
U.S. Appl. No. 10/612,666, Sep. 15, 2011, Advisory Action.
U.S. Appl. No. 10/612,666, Mar. 1, 2012, Non-Final Office Action.
U.S. Appl. No. 10/612,666, Oct. 30, 2012, Final Office Action.
U.S. Appl. No. 10/612,666, filed Jun. 30, 2003, Notice of Allowance dated Feb. 19, 2013, 32 pages.
Extended European Search Report for EP 06 120 149, dated Jan. 25, 2007, 6 pages.
U.S. Appl. No. 11/225,994, filed Sep. 14, 2005, Office Action dated Feb. 24, 2009, 10 pages.
U.S. Appl. No. 11/225,994, filed Sep. 14, 2005, Final Office Action dated Jul. 30, 2009, 10 pages.
U.S. Appl. No. 11/225,994, filed Sep. 14, 2005, Advisory Action dated Oct. 27, 2009, 3 pages.
U.S. Appl. No. 11/225,994, filed Sep. 14, 2005, Office Action dated Jan. 25, 2010, 11 pages.
U.S. Appl. No. 11/225,994, filed Sep. 14, 2005, Final Office Action dated Jul. 22, 2010, 10 pages.
U.S. Appl. No. 11/225,994, filed Sep. 14, 2005, Advisory Action dated Oct. 15, 2010, 3 pages.
U.S. Appl. No. 11/225,994, filed Sep. 14, 2005, Office Action dated Sep. 19, 2011, 10 pages.
U.S. Appl. No. 11/225,994, filed Sep. 14, 2005, Notice of Allowance dated Mar. 21, 2012, 11 pages.
U.S. Appl. No. 11/638,121, filed Dec. 13, 2006, Requirement for Restriction/Election dated Nov. 27, 2009, 7 pages.
U.S. Appl. No. 11/638,121, filed Dec. 13, 2006, Office Action dated Apr. 15, 2010, 14 pages.
U.S. Appl. No. 11/638,121, filed Dec. 13, 2006, Final Office Action dated Oct. 15, 2010, 14 pages.
U.S. Appl. No. 11/638,121, filed Dec. 13, 2006, Advisory Action dated Dec. 23, 2010, 2 pages.
U.S. Appl. No. 11/225,994, Notice of Allowance dated Aug. 24, 2012, 5 pages.
U.S. Appl. No. 11/638,121, Non-Final Office Action dated May 23, 2014, 11 pages.
European Application No. 06120148, Extended European Search Report dated Dec. 27, 2006, 12 pages.
European Application No. 06120149, European Search Report dated Mar. 12, 2007, 6 pages.
U.S. Appl. No. 11/638,121, Non-Final Office Action dated May 20, 2016, 17 pages.

U.S. Appl. No. 11/638,121, filed Dec. 13, 2006, Final Office Action dated Aug. 20, 2015, 31 pages.
U.S. Appl. No. 11/638,121, Non-Final Office Action dated Mar. 4, 2015, 12 pages.
U.S. Appl. No. 11/638,121, filed Dec. 13, 2006, Advisory Action dated Nov. 19, 2015, all pages.
U.S. Appl. No. 11/638,121, filed Dec. 13, 2006, received a Non Final Office Action dated Jul. 18, 2017, 13 pages.
U.S. Appl. No. 10/404,495, filed Apr. 1, 2003, Restriction Requirement dated Jan. 23, 2008, 6 pages.
U.S. Appl. No. 10/404,495, filed Apr. 1, 2003 Non-Final Office Action dated May 9, 2008, 9 pages.
U.S. Appl. No. 10/404,495, filed Apr. 1, 2003 Final Office Action dated Nov. 25, 2008, 11 pages.
U.S. Appl. No. 10/404,495, filed Apr. 1, 2003 Advisory Action dated Feb. 6, 2009, 2 pages.
U.S. Appl. No. 10/404,495, filed Apr. 1, 2003 Non-Final Office Action dated May 28, 2009, 16 pages.
U.S. Appl. No. 10/404,495, filed Apr. 1, 2003 Final Office Action dated Dec. 28, 2009, 18 pages.
U.S. Appl. No. 10/404,495, filed Apr. 1, 2003 Advisory Action dated Mar. 10, 2010, 2 pages.
U.S. Appl. No. 10/404,495, filed Apr. 1, 2003 Non-Final Office Action dated Jun. 20, 2013, 17 pages.
U.S. Appl. No. 10/404,495, filed Apr. 1, 2003 Final Office Action dated Jan. 15, 2014, 14 pages.
U.S. Appl. No. 10/404,495, filed Apr. 1, 2003 Non-Final Office Action dated Oct. 22, 2015, 28 pages.
U.S. Appl. No. 10/404,495, filed Apr. 1, 2003 Final Office Action dated May 6, 2016, 35 pages.
U.S. Appl. No. 15/275,931, filed Sep. 26, 2016, First Action Interview Pre-Interview Communication, dated Feb. 14, 2017, 9 pages.
U.S. Appl. No. 15/275,931, filed Sep. 26, 2016, Notice of Allowance, dated Jun. 1, 2017, 8 pages.
U.S. Appl. No. 11/638,121, filed Dec. 13, 2006 Advisory Action, dated May 4, 2017, 5 pages.
U.S. Appl. No. 11/638,121, filed Dec. 13, 2006 Final Office Action, dated May 4, 2017, 5 pages.
Office Action in European Patent Application No. 06120149.7, dated Oct. 18, 2007, 3 pages.
Office Action in European Patent Application No. 06120149.7, dated Jun. 6, 2007, 4 pages.
Office Action in European Patent Application No. 06120149.7, dated Oct. 2, 2006, 4 pages.
European Application No. 06120148.9 filed Sep. 5, 2006 received an European Search Report dated Dec. 27, 2016, 11 pages.
U.S. Appl. No. 10/612,666, filed Jun. 30, 2003, Non-final Office Action dated Oct. 31, 2006, 21 pages.
U.S. Appl. No. 10/612,666, filed Jun. 30, 2003, Non-final Office Action dated Dec. 31, 2007, 27 pages.
U.S. Appl. No. 10/612,666, filed Jun. 30, 2003, Non-final Office Action dated May 21, 2009, 15 pages.
U.S. Appl. No. 10/612,666, filed Jun. 30, 2003, Non-final Office Action dated Apr. 5, 2010, 16 pages.
U.S. Appl. No. 10/612,666, filed Jun. 30, 2003, Non-final Office Action dated Jan. 7, 2011, 19 pages.
U.S. Appl. No. 10/612,666, filed Jun. 30, 2003, Non-final Office Action dated Mar. 1, 2012, 21 pages.
U.S. Appl. No. 10/612,666, filed Jun. 30, 2003, Final Office Action dated Jun. 15, 2007, 28 pages.
U.S. Appl. No. 10/612,666, filed Jun. 30, 2003, Final Office Action dated Jul. 9, 2008, 18 pages.
U.S. Appl. No. 10/612,666, filed Jun. 30, 2003, Final Office Action dated Dec. 4, 2009, 16 pages.
U.S. Appl. No. 10/612,666, filed Jun. 30, 2003, Final Office Action dated Sep. 13, 2010, 18 pages.
U.S. Appl. No. 10/612,666, filed Jun. 30, 2003, Final Office Action dated Jun. 23, 2011, 22 pages.
U.S. Appl. No. 10/612,666, filed Jun. 30, 2003, Final Office Action dated Oct. 30, 2012, 21 pages.
U.S. Appl. No. 10/612,666, filed Jun. 30, 2003, Advisory Action dated Aug. 31, 2007, 3 pages.

(56) References Cited

OTHER PUBLICATIONS

U.S. Appl. No. 10/612,666, filed Jun. 30, 2003, Advisory Action dated Feb. 19, 2010, 3 pages.
U.S. Appl. No. 10/612,666, filed Jun. 30, 2003, Advisory Action dated Dec. 1, 2010, 3 pages.
U.S. Appl. No. 10/612,666, filed Jun. 30, 2003, Advisory Action dated Sep. 15, 2011, 3 pages.
U.S. Appl. No. 10/612,666, filed Jun. 30, 2003, Pre-Appeal Brief Review Panel Decision—Rejected dated Jan. 13, 2009, 2 pages.

* cited by examiner

CRAFTED IDENTITIES

FIELD

The invention relates generally to network security and more particularly to techniques for creating and maintaining crafted identities.

BACKGROUND

An average Internet user or consumer faces an enormous challenge with conducting their affairs over the Internet. Every time a purchase is made for a good or service over the Internet an account is needed to complete that transaction. These accounts are hosted on systems managed by businesses. These businesses largely generate revenue and profit from selling goods and services and not from managing systems associated with a consumer's account. Consequently, it should come as no surprise that confidential consumer information is now literally and electronically all over the planet. Seldom do consumers question the competency or integrity of the businesses with which they electronically transact.

Also, new challenges are being presented every day on the Internet, which compound the problems. For example, consider scams related to phishers and pharmers, fake World-Wide Web (WWW) sites, bogus sites, deals to good to be true included within electronic mail (email) messages, and the like; all of which is an attempt to scam the consumer out of information that allows ready access to the consumer's funds and good name. These problems stem from the fact that the Internet consumer is unable to determine who they are in fact communicating with.

On the flip side of the matter, businesses face equal challenges if not more daunting issues. To effectively compete, businesses often have to provide services to employees, to provide information to both internal and external facing audiences, and to foster innovation among teams that are spread over the entire planet. Consequently, enterprise information is a target for attack of nefarious individuals. Essentially, businesses are faced with a challenge of, "who are we really communicating with over the Internet?"

An accepted business solution is authentication. But, this is one-sided in that the consumer often authenticates to the business but the business does not authenticate to the consumer. So, how does the consumer know that the purported businesses asking for authentication are not in fact phishers or pharmers? Likewise, legitimate businesses issue credentials to users and expect all those users to be responsible and not to expose these credentials over the Internet. Yet, how does a user truly know his/her access attempts are not being intercepted and compromised?

Accordingly, improved techniques for identity creation, maintenance, and use are desirable.

SUMMARY

In various embodiments, crafted identities are presented. More specifically, and in an embodiment, a method for creating a crafted identity is provided. A request to create a crafted identity is received from a principal. Roles and/or permissions are assembled for the crafted identity for accessing desired resources. A statement is created representing the crafted identity. The statement includes the roles, the permissions, and/or identifier information. In an embodiment, the identifier information may be used by the resources to validate the crafted identity and the roles and/or permissions are used to define access rights of the crafted identity to the resources.

DETAILED DESCRIPTION

Figure 1:
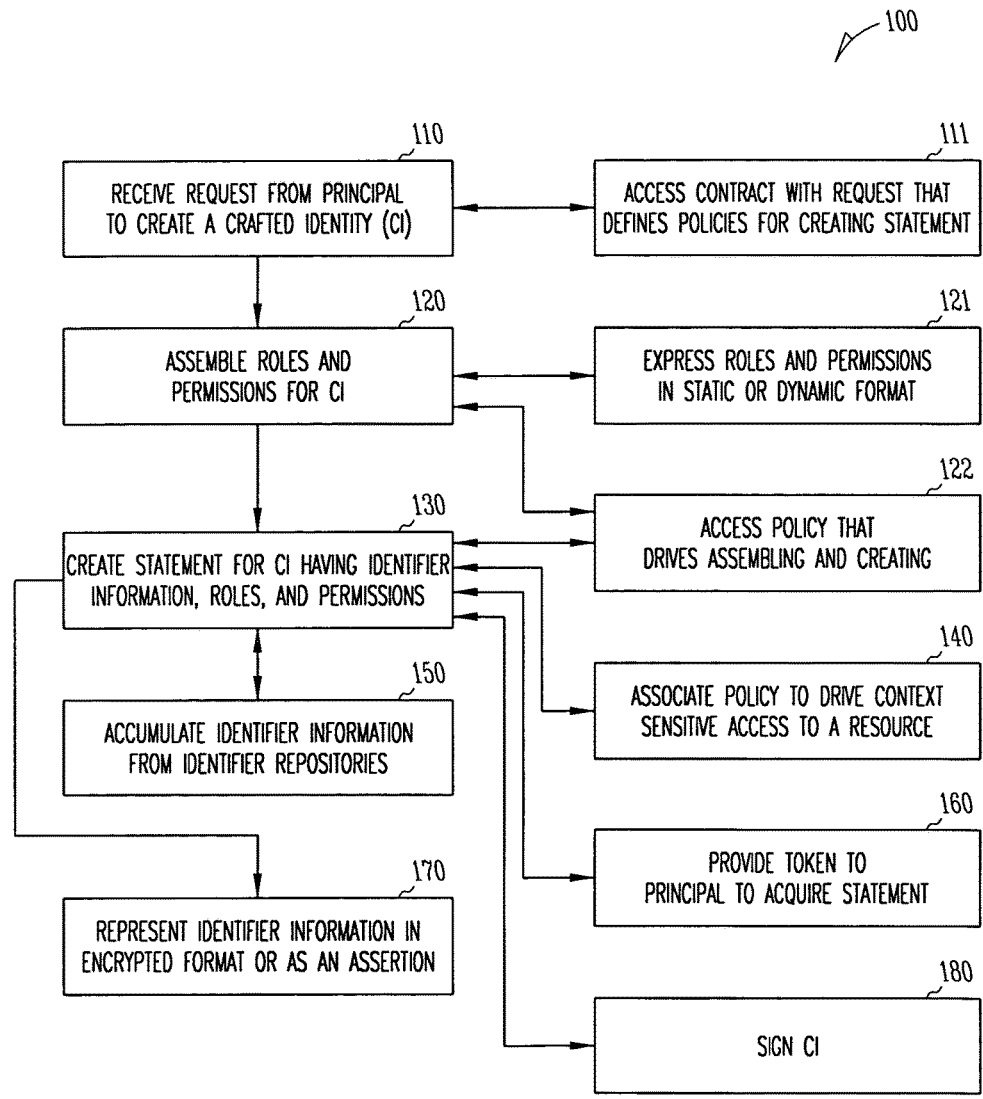
FIG. 1 is a diagram of a method for creating a crafted identity, according to an example embodiment.

A "resource" includes a service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from a one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc. As more and more identifiers are accumulated, a confidence in a particular identity grows stronger and stronger. In an embodiment, the identifier is a signature or a pair of signatures. For example, the signature of an identity service that vouches for a crafted identity, the signature of a principal associated with the crafted identity, or the signature of both the identity service and the principal.

"Authentication" is the process of validating the association of identifiers and secrets according to a policy, which is specific to the context in which the resulting identity is to be used. Thus, when identifiers are validated within a context specific to how an identity is to be used, it is authentication.

A "crafted identity" is an identity that may permit a principal's true identity to remain anonymous from the resource it seeks to access. With a crafted identity, an identity vault (e.g., one or more repositories holding secrets and identifiers) is opened to create the crafted identity and authenticate the principal to which it is associated, and then the identity vault is closed. Thereafter, the crafted identity can be validated by a resource, and acted upon without ever re-referencing the identity vault.

The creation, maintenance, and use of crafted identities are discussed in detail herein and below. In some embodiments, an identity service is used. Examples of an identity service can be found in: U.S. patent Ser. No. 10/765,523 ("Techniques for Dynamically Establishing and Managing Authentication and Trust Relationships"), U.S. Ser. No. 10/767,884 ("Techniques for Establishing and Managing a Distributed Credential Store"), and U.S. Ser. No. 10/770,677 ("Techniques for Dynamically Establishing and Managing Trust Relationships"). These applications are commonly assigned to Novell, Inc. of Provo, Utah and the disclosures of which are incorporated by reference herein.

The crafted identity may be represented in a variety of formats and include a variety of information. Some of this information, as will be demonstrated below, is consumed by resources to validate the crafted identity, and other portions of the information consumed by the principals using the crafted identities to manage access rights and limitations. A "statement" is a data structure that includes this information.

Various embodiments of this invention can be implemented in existing network architectures. For example, in some embodiments, the techniques presented herein are implemented in whole or in part in the Novell® network and proxy server products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a diagram of a method 100 for creating a crafted identity, according to an example embodiment. The method 100 (hereinafter "creation service") is implemented in a machine-accessible and readable medium. The creation service establishes a crafted identity on behalf of a principal requestor. In an embodiment, the creation service represents a modified version of the identity services discussed above; the modifications reflect the processing discussed below with this FIG. 1.

Initially, it should be noted that a requesting principal, who desires a usable crafted identity, authenticates to the creation service. That is, the creation service and the principal are in a trusted relationship with one another and communicate with one another securely. The creation service also has access to identifiers and secrets of the principal, so as to assure itself as to the true identity of the principal. The context of the communication is directed toward initially establishing a crafted identity, and within this context the creation service validates identifiers of the principal to assure the creation service as to an identity of the principal for the context. Also, as noted above, the principal may be any type of resource that is making a request for a crafted identity. Thus, the principal may be a user, a group of users, an automated service, etc.

At 110, the creation service receives a creation request from the principal. The request is for the principal to acquire a crafted identity. The crafted identity once created will preserve the anonymity of the principal and prevent resources from accessing information about the principal, except for information included within the crafted identity.

In an embodiment, at 111, the creation service acquires a contract associated with the request. The contract identifies or defines policies that are enforced when creating the crafted identity. Furthermore, the contract may identity the type of crafted identity that is to be created.

It should be noted that the principal may actually be authenticated to the creation service after a creation request for a crafted identity is received or during receipt of a request. Thus, the timing of the authentication can occur prior to the request, with a request, and/or after a request is received and has began to be processed by the creation service. Additionally, the authentication may include, but is not limited to, challenges from the creation service to the principal for passwords, smart token responses, responses requiring associated private keys, biometric responses, challenges for other identifiers or secret information, temporal constraints, etc.

At 120, the creation service assembles roles and/or permissions for the crafted identity. A role is a designation recognized within the context of a given resource, such as and by way of example only, administrator, supervisor, visitor, etc. Permissions are defined access rights for a given role on a given resource, such as and by way of example only, read access, write access, read and write access, etc.

The crafted identity may be directed to providing anonymous access for the requesting principal to one or more resources for defined purposes that are enumerated or derivable from the initial request. In this regard, policies drive the roles and/or permissions represented in the crafted identity. These roles and/or permissions combine to form access rights to a specific resource. The policies may be dictated by the specific resource.

In an embodiment, at 121, the roles and/or permissions may be expressed as a static definition or a dynamic specification. A static definition may be predefined for a given role; thus, resolution of permissions for a given role is fully calculated and declared once assembled for the crafted identity. Conversely, the roles and/or permissions may be expressed within a specification that is associated with the crafted identity. The specification is evaluated on a given local system in a given local environment of a target resource to determine the roles and/or permissions dynamically and at runtime. A dynamic approach permits roles/or and permissions to be dynamically resolved based on a given context or situation, such a situation is flexible and allows roles and/or permissions to be provisionally defined within the crafted identity and resolved within a given context at runtime.

In some cases, the original authentication between the creation service and the principal may necessitate the acquisition of attributes. These attributes may be acquired via enterprise directories or other attribute providers. Moreover, some of the attributes may be included in the final crafted identity being created for the principal. The addition of these attributes may also be governed by policy. In some cases, the roles may be viewed as a form of an attribute.

According to an embodiment, at 122, the creation service may associate one or more policies that drive the assembly and creation of the crafted identity and its associated information. Policy may dictate what is included and what is not included in the crafted identity and related information.

At 130, a statement or related information represented a competed crafted identity is created. Here, the roles and/or permissions, any attributes, and identifier information for the newly created crafted identity is packed in a format defined by policy or other specification.

In some cases, at this point, the creation service may separately interact with one or more resources that are associated with the crafted identity and established the crafted identity to be recognized by those resources. This registers the crafted identity with the resources. In other cases, the creation service is a modified identity service and has access to a pool of existing identities for the resources and is authorized to distribute them. In still other situations, the creation service is the validating service for the resources and thus does not have to have any additional communications with the resources. In yet more situations, the crafted identity appears to the resources to be the creation service, such that no additional communication is required with the resources in creating the crafted identity.

In an embodiment, at 140, the creation service may also package in the statement a policy that is context-sensitive. The policy permits the crafted identity to be managed from different and disparate environments based on context. Other types of context-sensitive policies may permit the principal to determine access rights based on the contexts or environments within which the desired resource is being accessed by the principal with the crafted identity.

According to an embodiment, at 150, the creation service may accumulate identifier information from a variety of identity vaults or identifier repositories. The identifier information is comprised or attributes concerning the principal that is, according to policy, to be exposed in the crafted identity. The resource may use these attributes to further validate the crafted identity. The identifier information may be a key, a signature of the creation service, a certificate, etc. The identifier information does not permit the resource validating it to acquire additional identifier information about the principal. Once the resource validates the crafted identity when presented by the principal, the principal assumes the crafted identity within the context of accessing the resource and may remain anonymous to the resource. Yet, the resource is assured that it is dealing with a legitimate and uncompromised identity, because of the role of the creation service.

In still other embodiments, the creation service may maintain and manage the crafted identity, such as when the creation service is a modified identity service. Accordingly, the statement may be provided to the principal on an as needed or dynamic basis when the principal desires to use it to access a given resource. Thus, at 160, rather than directly providing the statement representing the crafted identity to the principal, the creation service may provide a token to the principal and the principal acquires the statement when desired using the token.

The creation service manages and maintains the crafted identity. Consequently, different portions of a crafted identity may become stale or be revoked by a particular resource and the remaining portions of the crafted identity remain valid for use. Additionally, new roles and/or permissions may be added dynamically to a given crafted identity. However, it should be noted that in some embodiments a policy may dictate that a particular crafted identity cannot be expanded, such that to expand a crafted identity a new instance of a crafted identity has to be established.

In an embodiment, at 170, the creation service may represent the identifier information of the crafted identity that is included in the statement in an encrypted format, so as to prevent is interception or use. The identifier information may also be expressed as a statement, such as a Liberty assertion, a Security Assertion Markup Language (SAML) assertion, etc. As stated before, the identifier information may also include key information such as Kerberos, certificates, signatures, etc. The statement represents a final expression of the crafted identity.

According to an embodiment, at 180, the creation service signs the final version of statement that represents the crafted identity. This digital signature of the creation service serves as assertion as to the authenticity of the crafted identity for other services, principals, and/or resources that trust the creation service. In some cases, the statement may also be signed by the principal receiving it or a principal service (discussed below with FIG. 2).

Once the creation service has created the crafted identity for the principal and has included a mechanism for the principal to acquire and access the statement representing the crafted identity, the principal may use the information within the statement to securely, and optionally anonymously, access a desired resource for which the crafted identity was created.

It should also be noted, that a single crafted identity may include identifier information that can be validated and used with more than one desired resource. So, a single crafted identity and statement may provide a requesting principal with anonymous access to a plurality of different resources.

Also, the creation service may associate constraints with any provided crafted identity or portion thereof. Some constraints may include a time-to-live or an event, such that when detected the crafted identity, or portion thereof, is revoked or no longer valid. A policy may also constrain the crafted identity. The policy may monitor the usage and access of the principal and revoke the crafted identity upon detected misuse. In this way, the creation service may actively and dynamically manage the crafted identity.

Figure 2:
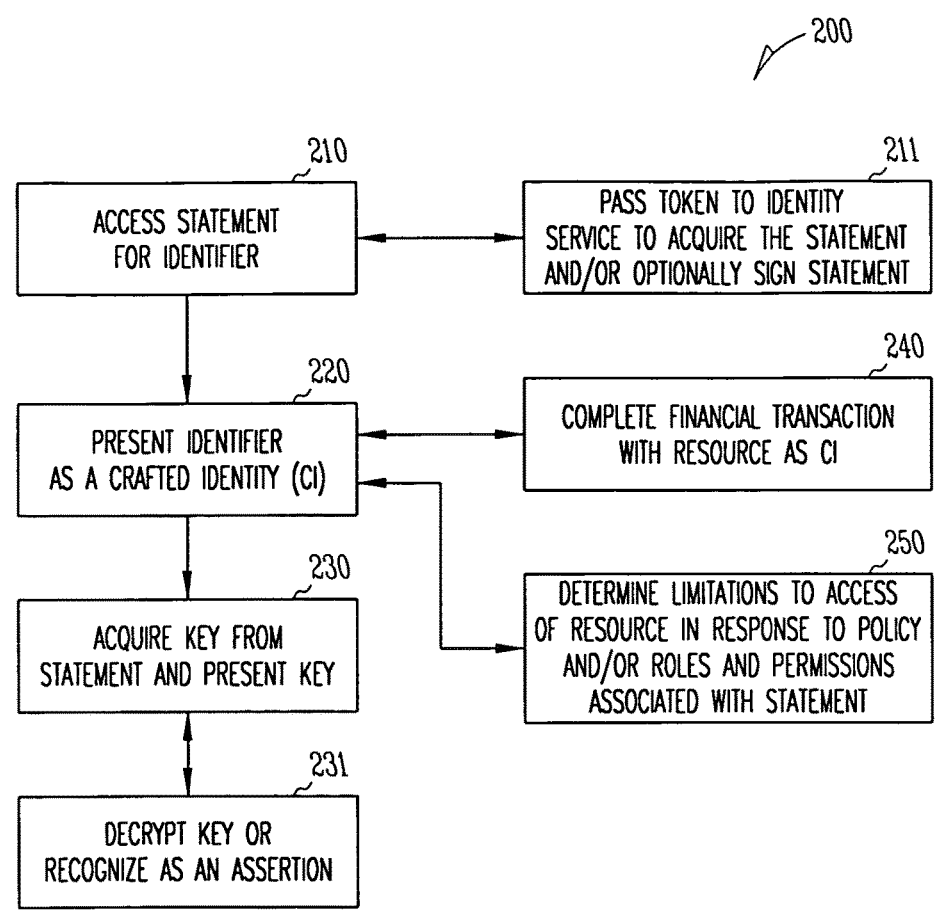
FIG. 2 is a diagram of a method for using a crafted identity, according to an example embodiment.

FIG. 2 is a diagram of a method 200 for using a crafted identity, according to an example embodiment. The method 200 (hereinafter "principal service") is implemented in a machine-accessible and readable medium. The principal service represents the processing of a principal that uses a crafted identity to access resources. A principal previously acquired the crafted identity by requesting it from a creation service, such as the creation service represented by the method 100 of FIG. 1.

At 210, the principal service accesses a statement that represents a crafted identity to acquire an identifier. The access is based on a desired resource that a principal may want to anonymously interact with and access. In an embodiment, at 211, the principal service passes a token to an identity service to acquire the statement. In other embodiments, the statement is maintained within a local environment of the principal service once provided by the identity service (creation service) in response to a request from the principal. In some cases, at 211, the principal service may also sign the statement. This adds to the authenticity of the statement, and the statement may also have been signed by the creation/identity service.

At 220, the principal service presents an identifier acquired from the statement to a desired resource as a crafted identity. The identifier may be signed or may vouch for an identity service (creation service) that the resource trusts. Alternatively, the identifier may provide evidence of an identity that is recognized by the resource. That identity was created or registered by the identity service (creation service) upon the conclusion of the creation process for the crafted identity.

In an embodiment, at 230, the principal service may also acquire an additional key from the statement and use that key as further identifier information to the resource. For example, a particular resource may require an ID and password, the identifier may be the ID and the key may be viewed as the password. The key may also be more complex, such as a signature of the identity service (creation service), a certificate, etc. In some cases, at 240, the key and/or identifier may be decrypted within the statement, such that it is decrypted by the principal service before being presented to the resource. In other cases, at 240, the key and/or identifier may be represented within the statement as an assertion, signed by an identity service (creation service) and relied upon as authenticate by the resource.

At this point, the resource that receives the identifier validates it and then recognizes the principal, not as the principal, but as the crafted identity. The access rights defined by roles and privileges may also be included in the statement, such that the principal service may determine and enforce access attempts made by the principal to the resource.

According to an embodiment, at 250, the principal service may be used to provide the principal with access to the resource for purposes of completing a financial transaction in an anonymous fashion. One way to do this, is for the details of the transaction to be hidden within the creation service and performed through the creation service, such that a creation service credit card or account is presented to the resource to complete the transaction, where the actual credit card number or account is debited by the creation service. The creation service may facilitate the transaction and vouch for it to the resource, but the resource is unable to discern the credit card number of account number used in the transaction.

It is understood that a variety of accesses may be performed, and that the above example should not be construed to limit the types of accesses that can benefit from the teachings presented herein. In fact, any anonymous access to a resource that utilizes a crafted identity in the manners described herein is intended to fall within the generous scope of this disclosure.

The creation service of FIG. 1 created and established a crafted identity and provided techniques for managing and maintaining crafted identities. The principal service of FIG. 2 consumed that crafted identity and used it in a practical manner to gain access to a desired resource. In some cases, that access is anonymous access. The two combined services (creation and principal services) present a powerful way in which business may be conducted over the Internet. Both users and businesses may be assured as to the legitimacy and privacy of transactions in manners that are significantly improved over conventional authentication.

Figure 3:
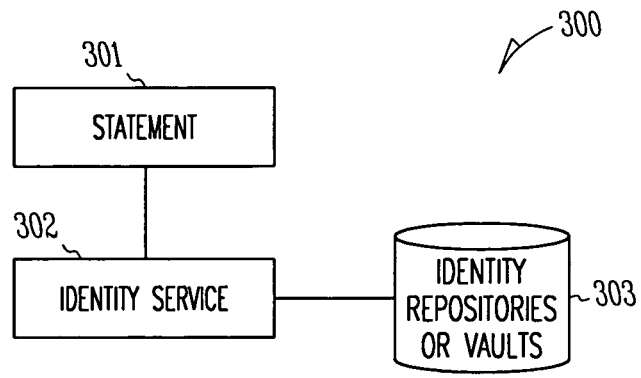
FIG. 3 is a diagram of a crafted identity system, according to an example embodiment.

FIG. 3 is a diagram of a crafted identity system 300, according to an example embodiment. The crafted identity system 300 is implemented in a machine-accessible and readable medium and is operational over a network. The network may be wired, wireless, or a combination of wired and wireless. In an embodiment, the crafted identity system 300 implements among other things the creation service represented by the method 100 of FIG. 1. Also, the crafted identity system 300 interacts and communicates with instances of a principal service represented by the method 200 of FIG. 2.

The crafted identity system 300 includes a statement 301 and an identity service 302. In some embodiments, the crafted identity system 300 may also include one or more identity repositories or vaults 303. Each of these will now be discussed in turn.

The statement 301 represents a crafted identity. The statement 301 is a product of the identity service 302. The identity service 302 produces the statement in response to policy and a request from a principal for a crafted identity. The crafted identity masks the true identity of the principal as the principal accesses a resource, the resource assumes the crafted identity is legitimate because of the presence of the identity service 302; and yet, the identity of the principal remains anonymous during the access of the resource.

Examples of a statement 301 and its creation were provided above with respect to the creation service represented by the method 100 of FIG. 1. Examples of how the statement 301 is consumed and used by a principal via a principal service were presented above with respect to the method 200 of FIG. 2.

The statement 301 includes roles and/or permissions for the crafted identity. The roles and/or permissions define limitations on access to a resource by a principal using the crafted identity, which is represented by the statement 301. The statement 301 also includes one or more identifiers. The identifiers are validated by the resources to assure the resources that the access requested is coming from a legitimate requestor. In an embodiment, the identifier is encrypted within the statement 301. According to an embodiment, the identifier is represented as an assertion from the identity service 302. In some embodiments, the statement 301 may also include attribute information.

The identity service 302 produces the statement 301 in response to a request from a principal to create a crafted identity. During or before this request, the identity service 302 may access a variety of identity repositories or vaults for purposes of authenticating the identity of the requesting principal. These identifiers validated by the identity service 302 during initial authentication of the requesting principal may not be included in the statement 301. Thus, the identity of the principal may be preserved and may remain anonymous with the crafted identity and the statement 301 that represents the crafted identity and its use.

In an embodiment, the identity service 302 acquires a contract in a creation request from the principal. The contract defines limitations and/or policies for forming the statement 301. The contract may also define the format with which the statement 301 is to be expressed and supplied back to the principal or a principal service, such as the principal service represented by the method 200 of FIG. 2.

According to an embodiment, the identity service 302 maintains and manages the statement 301 according to a use policy. The use policy may be different than the policy or contract that may have been used to initially create the statement 301 for the crafted identity. Additionally, the statement 301 may also include context-sensitive policies. These context-sensitive policies may define access rights for a principal according to specific or given contexts.

The identity service 302 generates and maintains the statement 301 on behalf of a principal. A principal uses the statement 301 to acquire anonymous access to resources. Privacy is maintained between both a resource and the principal and both are assured of anonymity because of the third-party and trusted relationship with the identity service 302 that facilitates the crafted identity and preserves its integrity.

Figure 4:
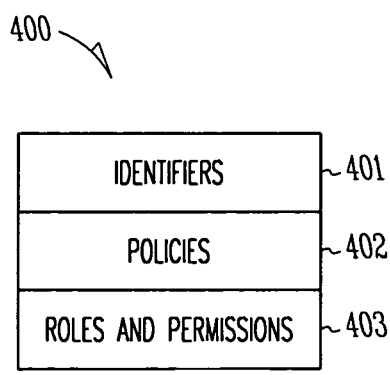
FIG. 4 is a diagram of a data structure representing a crafted identity, according to an example embodiment.

FIG. 4 is a diagram of a data structure 400 representing a crafted identity, according to an example embodiment. The data structure 400 is implemented in a machine-accessible and readable medium for purposes of providing access to a resource in a secure and trusted manner. In an embodiment, the data structure 400 is implemented as the statement 301 presented above with the crafted identity system 300 of FIG. 3.

The data structure 400 includes one or more identifiers 401, one or more policies 402, and one more roles and/or permissions 403. Each of these will now be discussed in turn.

The identifiers 401 are created by a creation service or an identity service, such as the creation service represented by the method 100 of FIG. 1 and the identity service 302 presented in the crafted identity system 100 of FIG. 3. The identifiers 401 are presented by principal services on behalf of principals to validate the crafted identity for access to a given resource. An example principal service was presented above with the method 200 of FIG. 2. The identifiers 401 need not be traceable by the resources to the requesting principal; thus, the anonymity of the principal is maintained and secured.

In an embodiment, the identifiers 401 are encrypted or are represented as assertions from the creation or identity service. The assertions may be implemented as Liberty or SAML assertions. The assertions are assured because they are made by the creation or identity service and vouch for the crafted identity and are relied upon by the resources.

The policies 402 are also created by a creation service or an identity service. The policies define limitations on access rights for given contexts that a principal may encounter when accessing a given resource.

The roles and/or permissions define access rights for given roles that the crafted identity may assume with respect to accessing the resource. The definition of the roles and/or permissions may be static and fully declared within the data structure 400 or may be represented as a specification that is adapted to be dynamically resolved at runtime or when a specific access of a resource is made.

In some embodiments, the data structure 400 may also include attribute information or other information that may prove useful to the principal in anonymously accessing the desired resources and to the creation or identity service in maintaining and managing the data structure 400.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
receiving, by a computer system from a user, a request to create a crafted identity for the user;
accessing, by the computer system, a contract with the request that defines policies for creating a statement of the crafted identity;
evaluating, by the computer system, the contract to acquire data comprising authentication information, aggregated attributes, and aggregated policies for use by the user;
authenticating, by the computer system, a digital identity of the user;
creating, by the computer system in response to authenticating the digital identity of the user, the crafted identity for the user, the crafted identity comprising one or more identifiers, the one or more identifiers of the crafted identity preserving anonymity of the digital identity of the user;
assembling, by the computer system, a provisional specification of roles and permissions for the crafted identity based at least in part on the data acquired from the contract, the roles and permissions defining access rights to one or more resources;
creating, by the computer system, a statement in the crafted identity, the statement including the provisional specification of the roles and the permissions;
registering, by the computer system, the crafted identity with the resources on behalf of the user;
providing, by the computer system, the crafted identity to a principal computer;
detecting, by the computer system, a context corresponding to one or more access operations, associated with the crafted identity, with respect to a particular resource within an environment of the particular resource, wherein the context is based at least in part on whether or not the one or more access operations of the particular resource correspond to a misuse of the particular resource;
in response to the detecting, evaluating, by the computer system, the provisional specification of the roles and the permissions, and, at a time when resource access is made with the provisional specification of the roles and the permissions, dynamically resolving at least one of the roles and/or the permissions by modifying the provisional specification based at least in part on the detecting of the context corresponding to the one or more access operations of the particular resource; and
consequent to the dynamically resolving the at least one of the roles and/or the permissions at the time, enforcing, by the computer system, one or more limitations on access by the principal computer to the particular resource using the crafted identity based at least in part on the at least one of the roles and/or the permissions dynamically resolved, while facilitating the digital identity remaining anonymous to the particular resource during the principal computer's access of the particular resource via the crafted identity, the enforcing comprising: updating the contract to derive a modified crafted identity based at least in part on modifying the aggregated policies in response to a permissible modification requested by the user, deriving a modified crafted identity from the updated contract, and enforcing access limitations on the principal computer with respect to the particular resource using the modified crafted identity.

2. The method of claim 1, wherein identifier information validates the crafted identity.

3. The method of claim 1, wherein assembling and creating further include accessing a policy that defines a format of the statement that represents the crafted identity.

4. The method of claim 1, wherein assembling further includes expressing the roles and permissions as at least one of a static definition and a dynamic specification, wherein the dynamic specification is resolved when access to the resources are attempted using the statement.

5. The method of claim 1, further comprising associating, by the computer system, a policy within the statement that dictates context-sensitive or context-driven access rights for the resources.

6. The method of claim 1, further comprising accumulating, by the computer system, identifier information from one or more identity repositories.

7. The method of claim 1, further comprising providing, by the computer system, a token to the principal computer to acquire the statement for the crafted identity.

8. The method of claim 7, wherein receiving further includes accessing a contract with the request that defines policies for creating the statement of the crafted identity.

9. The method of claim 1, wherein creating further includes representing identifier information of the statement in a format of at least one of encrypted and an assertion.

10. The method of claim 1, further comprising signing, by the computer system, the statement.

11. A computer-readable memory comprising a set of instructions stored therein which, when executed by a processor, causes the processor to:
process a request, received from a user, to create a crafted identity for the user;
access a contract with the request that defines policies for creating a statement of the crafted identity;
evaluate the contract to acquire data comprising authentication information, aggregated attributes, and aggregated policies for use by the user;
authenticate a digital identity of the user;
create, in response to the authenticating the digital identity of the user, the crafted identity for the user, the crafted identity comprising one or more identifiers, the one or more identifiers of the crafted identity preserving anonymity of the digital identity of the user;
assemble a provisional specification of roles and permissions for the crafted identity based at least in part on the data acquired from the contract, the roles and the permissions defining access rights to one or more resources;
create a statement in the crafted identity, the statement including the provisional specification of the roles and the permissions;
register the crafted identity with the resources on behalf of the user;
provide the crafted identity to a principal computer;
detect a context corresponding to one or more access operations, associated with the crafted identity, with respect to a particular resource within an environment of the particular resource, wherein the context is based on whether or not the one or more access operations of the particular resource correspond to a misuse of the particular resource;
in response to the detecting, evaluate the provisional specification of the roles and the permissions, and, at a time when resource access is made with the provisional specification of the roles and the permissions, dynamically resolving at least one of the roles and/or the permissions by modifying the provisional specification based at least in part on the detecting of the context corresponding to the one or more access operations of the particular resource; and
consequent to the dynamically resolving the at least one of the roles and/or the permissions at the time, enforce one or more limitations on access, by the principal computer to the particular resource using the crafted identity based at least in part on the at least one of the roles and/or the permissions dynamically resolved, while facilitating the digital identity remaining anonymous to the particular resource during the principal computer's access of the particular resource via the crafted identity, the enforcing comprising: updating the contract to derive a modified crafted identity based at least in part on modifying the aggregated policies in response to a permissible modification requested by the user, deriving a modified crafted identity from the updated contract, and enforcing access limitations on the principal computer with respect to the particular resource using the modified crafted identity.

12. The computer-readable memory of claim 11, wherein identifier information validates the crafted identity.

13. The computer-readable memory of claim 11, wherein the creating the statement comprises accessing at least one policy of the one or more policies that defines a format of the statement that represents the crafted identity.

14. The computer-readable memory of claim 11, wherein the assembling the roles and the permissions comprises expressing the roles and the permissions as one or both of a static definition and a dynamic specification, wherein the dynamic specification is resolved when access to the resources is attempted using the statement.

15. The computer-readable memory of claim 11, wherein the set of instructions, when executed by the processor, further cause the processor to associate at least one policy of the one or more policies within the statement, wherein the at least one policy dictates context-sensitive rights and/or context-driven access rights for the resources.

16. The computer-readable memory of claim 11, wherein the set of instructions, when executed by the processor, further cause the processor to accumulate identifier information from one or more identity repositories.

17. The computer-readable memory of claim 11, wherein the set of instructions, when executed by the processor, further cause the processor to cause transmission of a token to the principal computer to acquire the statement for the crafted identity.

18. The computer-readable memory of claim 17, wherein receiving further includes accessing a contract with the request that defines policies for creating the statement of the crafted identity.

19. The computer-readable memory of claim 11, wherein creating further includes representing identifier information of the statement in a format of at least one of encrypted and an assertion.

20. The computer-readable memory of claim 11, wherein the set of instructions, when executed by the processor, further cause the processor to sign the statement.

21. A system comprising:
a processor; and
a memory comprising a set of instructions stored therein which, when executed by the processor, causes the processor to:
process a request, received from a user, a request to create a crafted identity for the user;
access a contract with the request that defines policies for creating a statement of the crafted identity;
evaluate the contract to acquire data comprising authentication information, aggregated attributes, and aggregated policies for user by the user;
authenticate a digital identity of the user;
create, in response to the authenticating the digital identity of the user, the crafted identity for the user, the crafted identity comprising one or more identifiers, the one or more identifiers of the crafted identity preserving anonymity of the digital identity of the user;
assemble a provisional specification of roles and permissions for the crafted identity based at least in part on the data acquired from the contract, the roles and the permissions defining access rights to one or more resources;
create a statement in the crafted identity, the statement including the provisional specification of the roles and the permissions;
register the crafted identity with the resources on behalf of the user;
provide the crafted identity to a principal computer;

detect a context corresponding to one or more access operations, associated with the crafted identity, with respect to a particular resource within an environment of the particular resource, wherein the context is based on whether or not the one or more access operations of the particular resource correspond to a misuse of the particular resource;

in response to the detecting, evaluate the provisional specification of the roles and the permissions, and, at a time when resource access is made with the provisional specification of the roles and the permissions, dynamically resolving at least one of the roles and/or the permissions by modifying the provisional specification based at least in part on the detecting of the context corresponding to the one or more access operations of the particular resource; and consequent to the dynamically resolving the at least one of the roles and/or the permissions at the time, enforce one or more limitations on access to the particular resource using the crafted identity based at least in part on the at least one of the roles and/or the permissions dynamically resolved, while facilitating the digital identity remaining anonymous to the particular resource during the principal computer's access of the particular resource via the crafted identity, the enforcing comprising: updating the contract to derive a modified crafted identity based at least in part on modifying the aggregated policies in response to a permissible modification requested by the user, deriving a modified crafted identity from the updated contract, and enforcing access limitations on the principal computer with respect to the particular resource using the modified crafted identity.

22. The system of claim 21, wherein identity information validates the crafted identity.

23. The system of claim 21, wherein assembling and creating further include accessing a policy that defines a format of the statement that represents the crafted identity.

24. The system of claim 21, wherein assembling further includes expressing the roles and permissions as at least one of a static definition and a dynamic specification, wherein the dynamic specification is resolved when access to the resources are attempted using the statement.

25. The system of claim 21, wherein the set of instructions further causes the processor to associate at least one policy of the one or more policies within the statement, wherein the at least one policy dictates context-sensitive rights and/or context-driven access rights for the resources.

26. The system of claim 21, wherein the set of instructions further causes the processor to accumulate identifier information from one or more identity repositories.

27. The system of claim 21, wherein the set of instructions further causes the processor to cause transmission of a token to the principal computer to acquire the statement for the crafted identity.

28. The system of claim 27, wherein receiving further includes accessing a contract with the request that defines policies for creating the statement of the crafted identity.

29. The system of claim 21, wherein creating further includes representing identifier information of the statement in a format of at least one of encrypted and an assertion.

30. The system of claim 21, wherein the set of instructions further causes the processor to sign the statement.

* * * * *

UNITED STATES PATENT AND TRADEMARK OFFICE
CERTIFICATE OF CORRECTION

PATENT NO. : 10,063,523 B2  
APPLICATION NO. : 11/225993  
DATED : August 28, 2018  
INVENTOR(S) : Carter et al.

Page 1 of 1

It is certified that error appears in the above-identified patent and that said Letters Patent is hereby corrected as shown below:

On the Title Page

On page 3, Column 1, item (56) under Other Publications, Line 10, delete "Apr 15, 2020," and insert -- Apr 15, 2010, --, therefor.

In the Claims

In Column 12, Line 49, in Claim 21, delete "user by the user;" and insert -- use by the user; --, therefor.

Signed and Sealed this  
Sixteenth Day of July, 2019

Andrei Iancu  
*Director of the United States Patent and Trademark Office*